July 7, 1953 W. P. OEHLER 2,644,388

BEARING CONSTRUCTION FOR DISK HARROWS

Filed Sept. 4, 1947 4 Sheets-Sheet 1

INVENTOR
WILLIAM P. OEHLER

BY C. A. Parker and R. C. Johnson
ATTORNEYS

BEARING CONSTRUCTION FOR DISK HARROWS

Filed Sept. 4, 1947 4 Sheets-Sheet 2

INVENTOR
WILLIAM P. OEHLER
BY C. T. Parker and R. C. Johnson
ATTORNEYS

INVENTOR
WILLIAM P. OEHLER
BY C. T. Parker & R. C. Johnson
ATTORNEYS

July 7, 1953 W. P. OEHLER 2,644,388

BEARING CONSTRUCTION FOR DISK HARROWS

Filed Sept. 4, 1947 4 Sheets-Sheet 4

INVENTOR
WILLIAM P. OEHLER

BY C. T. Parker and R. C. Johnson
ATTORNEYS

Patented July 7, 1953 2,644,388

UNITED STATES PATENT OFFICE 2,644,388

BEARING CONSTRUCTION FOR DISK HARROWS

William P. Oehler, Moline, Ill., assignor to Deere & Company, Moline, Ill., a corporation of Illinois Application September 4, 1947, Serial No. 772,069

14 Claims. (Cl. 97—220)

The present invention relates generally to disk harrows and more particularly to the disk gang units of such implements and the bearing constructions incorporated in or associated with the disk gangs.

The object and general nature of the present invention is the provision of a new and improved bearing construction for the disk gangs of disk harrows and the like. More specifically, it is an important feature of this invention to provide a disk gang bearing wherein means is provided for pivotally connecting the bearing with an associated frame and new and improved bearing clamping means whereby the two portions of the bearing, which is usually of split construction, are held together without danger of loosening in operation, while accommodating pivotal action between the disk gang and the frame to which it is connected. Further, it is a feature of this invention to provide new and improved means for connecting the main frame of the disk harrow to the frame-receiving yoke of the bearing so as to accommodate, in addition to the aforesaid pivotal movement, pivotal movement of the gang in a horizontal direction relative to the main frame. Still further, it is a feature of this invention to provide new and improved means for holding the main frame in operative connection with the associated bearing yoke accommodating the aforesaid pivoting action.

Still another feature of the present invention is the provision of a new and improved means for holding the disks and associated parts assembled together to form the gang, it being a further feature of the invention in this connection to provide a combined gang bolt nut and washer in one integral part, the combined member being so constructed and arranged as to be held frictionally against loosening yet easily tightened either in the factory or shop by impact wrenches or in the field by striking the same with a hammer or the like.

These and other objects and advantages of the present invention will be apparent to those skilled in the art after a consideration of the following detailed description, taken in conjunction with the accompanying drawings, in which.

Figures 1, 10:
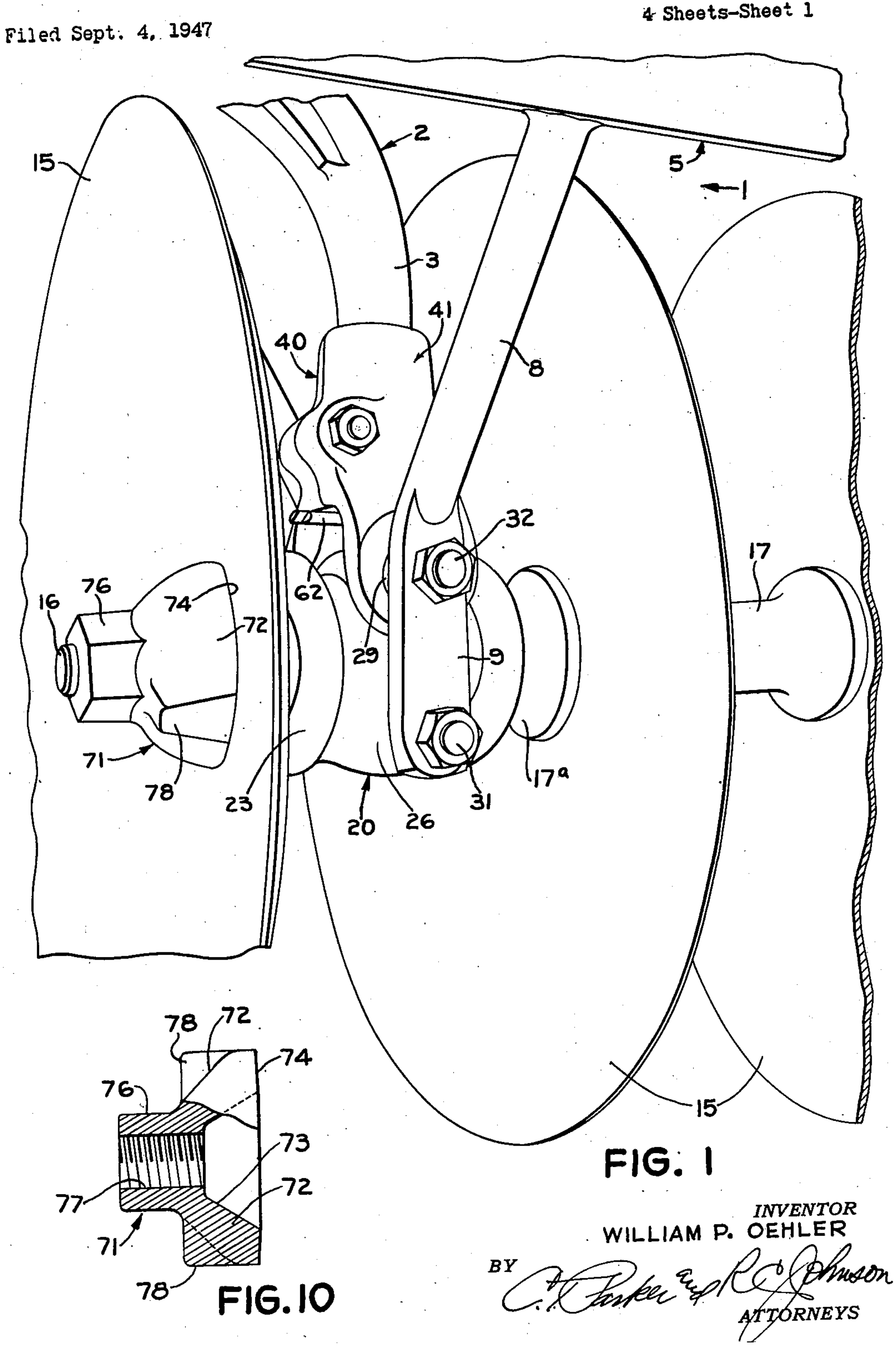
Figure 1 is a fragmentary perspective view of a disk harrow in which the principles of the present invention have been incorporated.
Figure 10 is a sectional view showing the details of the combined gang bolt nut and washer member.

Referring now to the drawings, the disk harrow in which the principles of the present invention have been incorporated is indicated in its entirety by the reference numeral 1 and is preferably of the type of implement shown in the United States Patent 2,339,124, issued January 11, 1944, to Charles H. White to which reference may be had if necessary. Briefly, the disk harrow 1 comprises a pair of front disk gangs and a pair of rear disk gangs, each gang including its own gang frame and each gang being pivotally connected at its inner ends to a frame standard forming a part of a main frame. The frame of the harrow is indicated in its entirety by the reference numeral 2 and is generally of approximately rectangular construction having at each corner thereof a depending frame standard 3. Each of the gang frames is indicated in its entirety by the reference numeral 5 and comprises a framework made up preferably of an angle member or members, and at each end each gang frame 5 has a pair of gang frame standards 8 extending generally downwardly in converging relation and terminating at their lower ends in approximately parallel flattened sections 9 having vertically spaced bolt receiving openings 10. Each disk gang includes, in addition to the frame 5 and associated parts described above, a plurality of disks 15 mounted on a gang bolt 16 and held in spaced apart relation by a plurality of spools 17 disposed between adjacent disks. The head of the gang bolt 16 is normally disposed at the outer end of each gang and at its inner end the gang bolt is threaded to receive a combined gang bolt nut and washer member to which detailed reference will be made below. At each end of each of the disk gangs the bearing spool, indicated at 17*a*, serves as a journal member to receive an associated bearing construction, indicated in its entirety by the reference numeral 20. The bearing constructions at the inner and outer ends of each gang are substantially identical, except that the inner bearing construction provides for pivotal connection of the associated main frame standard 3 thereto, and hence a detailed description of one of the inner bearing constructions will suffice.

Figures 2, 6:
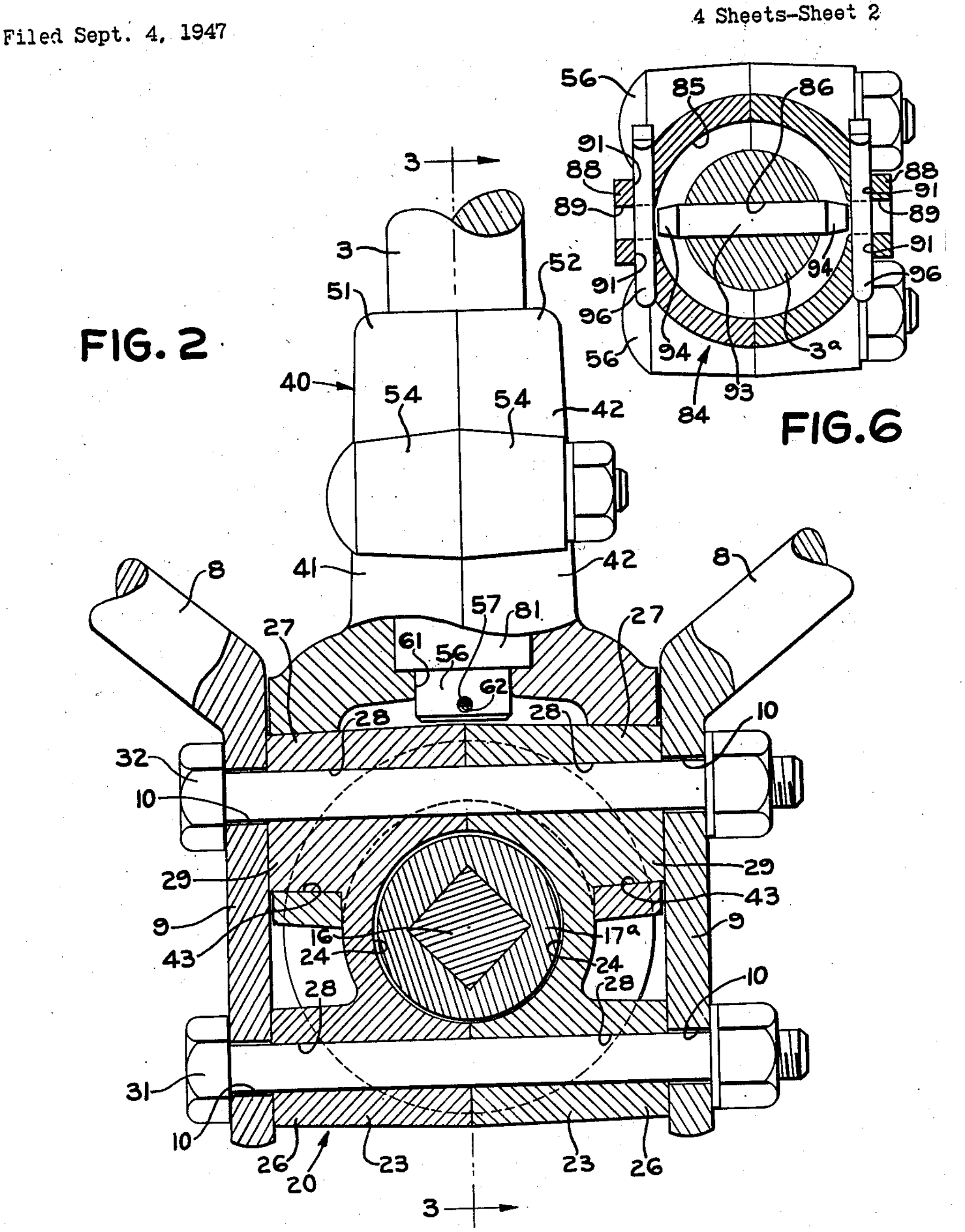
Figure 2 is a transverse sectional view showing my new and improved bearing construction and frame connection.
Figure 6 is a sectional view taken generally along the line 6—6 of Figure 5.

The bearing construction with which the present invention is more particularly concerned comprises a bearing sleeve made up of a pair of mating bearing sections 23, each having a substantially half cylindrical bearing surface 24 adapted to embrace and have bearing engagement with the outer surface of the associated gang journal member 17a. Centrally each of the bearing sleeve sections 23 is formed with apertured bolt-receiving extensions 26 and 27, the apertures in each being indicated by the reference numeral 28. Normally the plane of separation is disposed vertically so that the extensions 26 and 27 lie in vertically spaced relation and the bolt-receiving holes are disposed horizontally and extend generally in a fore and aft direction. The upper extension 27 is provided with a cylindrical boss section 29 the center of curvature C of which lies below the axis c of the associated bolt-receiving opening 28. A pair of clamping bolts 31 and 32 are inserted through the registering openings 28 for the purpose of clamping the two halves 23 of the bearing sleeve together so as to form a complete bearing, encircling the associated journal member 17a. As best shown in Figure 2, the spacing between the upper and lower bolt holes 28 is such that the bolts 31 and 32 are disposed above and below the associated journal member 17a. The bolts 31 and 32 also extend through the openings 10 in the lower portions of the associated gang frame standards 8, the flattened sections 9 of said standards lying substantially flat against the end portions of the extensions 26 and 27 on the bearing sleeve sections and are held rigidly thereagainst by tightening the nuts on the bolts 31 and 32. In this way the gang frame standards 8 are firmly and rigidly fixed to the associated bearing structure by which the gang frame, or at least that portion thereof, is supported on the associated disk gang.

As mentioned above, the main frame 1 of the disk harrow is supported on the inner ends of the four disk gangs. To this end, each of the inner bearing constructions 20 is provided with means for receiving the associated downwardly extending main frame extension or standard 3, which means will now be described.

Figure 4:
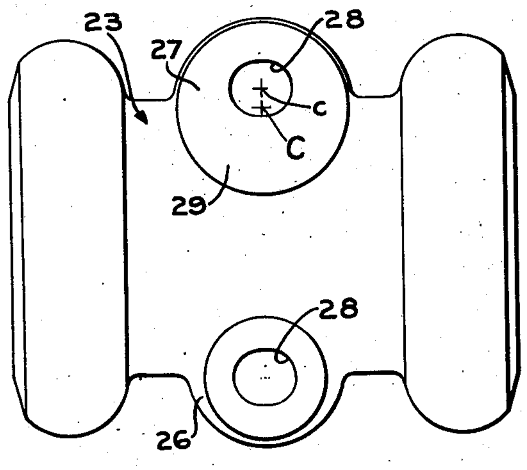
Figure 4 is a side view of one of the bearing members.

A yoke member 40 is mounted on each inner bearing construction and preferably comprises a pair of mating yoke sections 41 and 42, the lower portions of which are apertured, as at 43, and offset laterally so that when the parts are assembled the yoke member 40 includes a lower bifurcated portion that is adapted to embrace the upper part of the associated bearing sleeve. The apertures 43 in the lower laterally offset portions of the yoke sections 41 and 42 are adapted to be rockably mounted on the associated bosses 29 formed on the two halves of the bearing sleeve 23, 23. As best shown in Figure 4, the downward offset relationship between the cylindrical bosses 29 and the bolt holes 28 provides for a lowered point of connection between the yoke 40 and the associated bearing construction 20, that is, lowered with respect to the axis of the associated clamping bolt 32, yet without interfering with the firm clamping action secured by the use of the two through bolts 31 and 32 above and below the axis of the gang bolt and associated journal member 17a.

The upper portions 51 and 52 of the yoke sections 41 and 42 are generally semi-cylindrical so that when the parts are assembled on the associated bearing an upwardly extending generally vertically disposed frame standard-receiving socket S is provided. In the preferred form of yoke construction, each yoke section, 41 and 42, is provided with a pair of laterally disposed apertured ears 54 and 55 to receive a pair of clamping bolts 56 which hold the two halves of the yoke member 40 together. In one form of the present invention the lower end 81 of the associated frame standard 3 is reduced, as indicated by the reference numeral 56, and provided with a through aperture 57, thereby providing a downwardly facing shouldered section 58 which rests against a corresponding shouldered portion 59 formed on the lower portions of the yoke sections 41 and 42, at the lower end of the socket S. An opening 61 receives the extension 56, and a cotter key or other pin, as indicated at 62, is inserted through the hole 57 and when in place serves to retain the frame standard 3 in place in the associated socket S, fitting snugly within the latter but with sufficient freedom to permit the associated disk gang to swing about a generally vertical axis relative to the main frame. The disk gang is also capable of swinging about a generally horizontal axis, as defined by the bosses 29, relative to the main frame 2.

The combined gang bolt nut and washer member is of particular construction. This member, which is indicated in its entirety by the reference numeral 71, comprises a generally conical body portion 72 having a hollowed conical interior socket 73 and an annular disk-engaging surface 74. The member 71 also includes, integral with the body portion 72, a polygonal wrench-receiving head 76 having an interior tapped hole 77 adapted to threadedly engage the threaded portion of the gang bolt 16. A pair of oppositely disposed lugs 78 are formed on the body portion 72 and generally in axially spaced aligned relation with the associated portions of the disk-engaging surface 74. During assembly of the disk gang at the factory an impact wrench is customarily employed for tightening the member 18 on the gang bolt 16, the wrench having a portion engaging the portion 76. The disk-engaging annular face 74 is disposed a substantial distance radially outwardly of the head 76, but with an impact wrench the member may be tightened on the gang bolt sufficient to cause the annular face 74 to bear with extreme firmness against the associated disk. Actually, the member 71 is in the form of a casting and the annular face 74 thereof slightly rough, as is the nature of castings. However, when the member 71 is tightened with considerable force, the surface irregularities on the annular face 74, acting against the face of the adjacent disk 15, is smoothed but has a firm frictional engagement with the disk whereby there is very little tendency for the member 71 to become loosened in service.

The function of the striking lugs 78 is to provide means whereby the farmer or operator in the field may, if desired, loosen the member 71, as for the purpose of replacing broken disks, spools and the like, and subsequently after replacement tighten the member 71 with substantially the same firmness and rigidity as during the original factory assembly. The provision of the lugs 78 permits the farmer or operator to use a hammer or the like to strike the lugs either on one side or the other depending on whether it is desired to tighten or loosen the member 71. An impact wrench, connected with the head 76, may of course be used, but ordinarily the farmer or operator in the field is not equipped with a tool of this kind. The provision of the striking lugs 78 substantially axially adjacent the disk-engaging annular face 74 permits the member 71 to be tightened to an extent sufficient to cause the face 74 to frictionally grip the disk with the tightness and rigidity required for holding the member 71 against accidental loosening in service.

Figure 5:
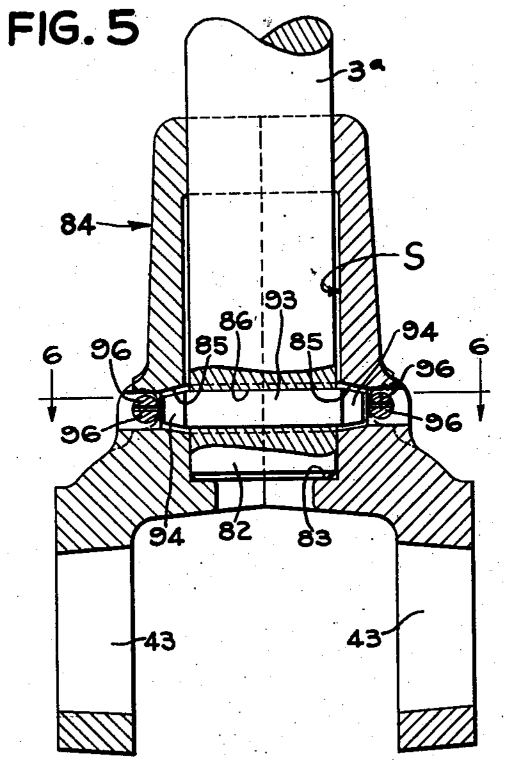
Figure 5 is a view similar to Figure 3, showing a modified form of connection between the bearing construction and the frame.
Figure 3:
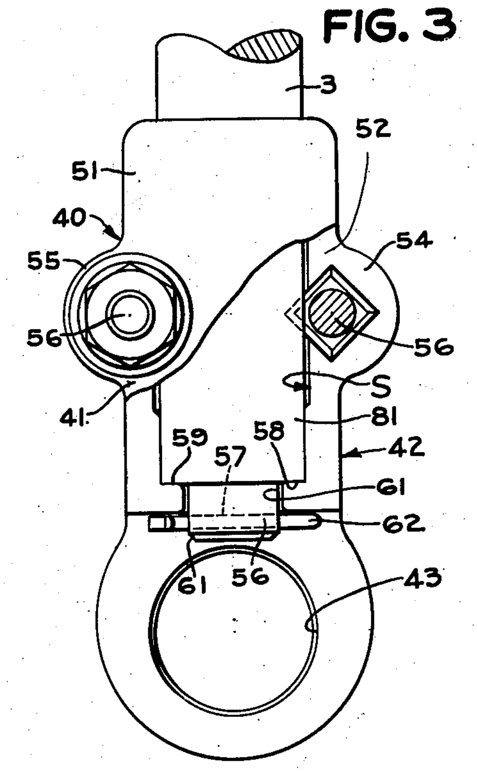
Figure 3 is a sectional view taken generally along the line 3—3 of Figure 2.

A modified form of connection between the main frame and the inner bearing construction is shown in Figure 5. Referring now to this figure, it will be seen that the lower end 82 of the frame extension or standard 3a is without any reduced extension. This eliminates the requirement and expense of forging a reduced end, as shown at 56 in Figure 3. The lower end 82 is adapted to rest against shoulders 83 formed on the yoke sections of the associated yoke member 84. The upper portions of the latter form a socket S receiving the frame extension 3a, and the yoke sections are provided interiorly with an annular groove 85 which registers with an opening 86 formed in the frame extension or standard 3a. In this form of the invention each of the yoke sections is provided with a boss 88 having a radial pin-receiving opening 89 and transverse openings 91 intersecting the opening 89. When the frame in this form of the invention is to be assembled onto the associated yoke members, each extension 3a is seated in the associated socket S. A pin 93, which may have tapered ends 94, is inserted through one of the yoke section openings 89 and with a small pin, punch or the like, pushed into the frame extension opening 86 to such position that the ends 94 are free to move around in the annular groove 85. A cotter pin or other suitable element 96 is then inserted in the openings 91 in each yoke member. As best shown in Figure 6, these two cotters prevent either end of the pin 93 from entering either of the yoke openings 89. Thus, the yoke member 84 is free to turn on the lower end of the frame extension 3a about a generally vertical axis without interference, yet when it is desired to disassemble the parts, it is a simple matter to take out both of the cotters 96, turn the yoke relative to the frame member 3a so as to have the pin 94 register with the openings 89, and then with a suitable tool remove the pin 89 from the opening 86 in the frame standard 3a, whereupon the latter may be removed from the socket S in the yoke member.

Figure 7:
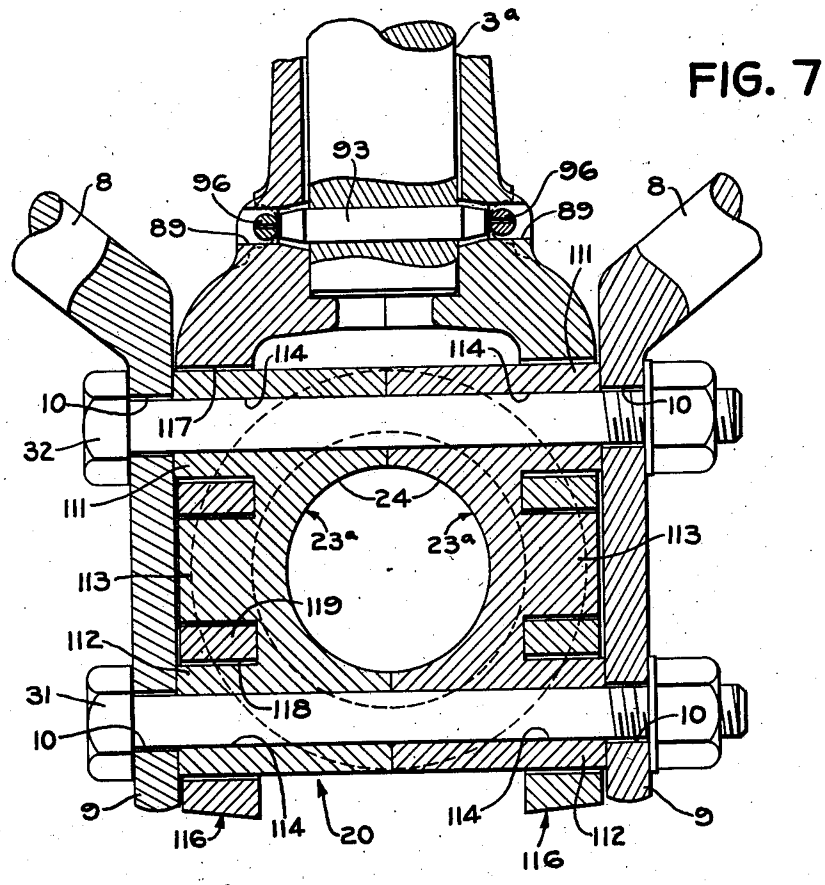
Figure 7 is a view similar to Figure 2 showing a modified form of bearing construction.
Figure 8:
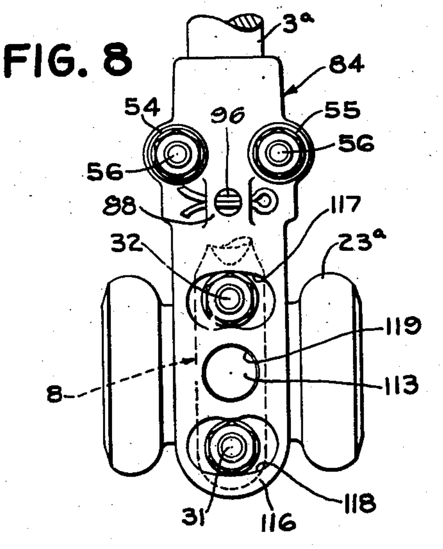
Figure 8 is a side view of the bearing construction shown in Figure 7.
Figure 9:
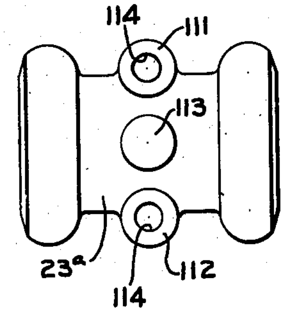
Figure 9 is a side view of one of the bearing members shown in Figures 7 and 8.

A further modification is shown in Figures 7–9. In this form of the invention the yoke-receiving bosses 29 are eliminated. Instead, each of the bearing sections 23a is provided with an upper boss 111, a lower boss 112 and a central boss 113, the latter being generally cylindrical. The upper and lower bosses 111 and 112 are provided with bolt holes 114 to receive clamping bolts such as those indicated by the reference numerals 31 and 32 in the form of the invention described above. In the form of the invention now described, the yoke member 84 has elongated offset sections 116, by virtue of which each part of the yoke member 84 is provided with an upper slot 117, a lower slot 118 and a central opening 119, the latter seating snugly on the associated boss 113. The slots 117 and 118 are of such length as to provide for rocking movement of the yoke member 84 on the associated bearing sleeve about a transverse axis defined by the central bosses 113. Thus, in this form of the invention, the relative movement between the disk gang and the frame takes place about an axis 113, and passes directly through the gang axis, whereas in the first form of the invention the axis of rocking movement between the disk gang and the frame takes place about an axis displaced slightly above the disk gang axis. Ordinarily, this slight amount of displacement, reduced by virtue of the offset relationship between the bosses 29 and the associated bolt holes 28 (Figure 4), is not enough to interfere with the proper action of the harrow, but where it is desired to eliminate entirely such displacement, the construction just described may be employed.

While I have shown and described above the preferred structure in which the principles of the present invention have been employed, it is to be understood that my invention is not to be limited to the exact details shown and described above, but that, in fact, widely different means may be employed in the practice of the broader aspects of my invention.

What I claim, therefore, and desire to secure by Letters Patent is:

1. In a disk harrow or the like, a bearing construction comprising a pair of bearing sleeve sections separable along a generally vertical plane passing through the axis of the bearing, a bifurcated yoke member adapted to be pivotally connected with said bearing sleeve sections, the bifurcated portions of said yoke member being apertured, generally cylindrical bosses formed on said sections and pivotally receiving the apertured portions of said bifurcated yoke member, gang frame standards disposed at the outer sides of said bearing sleeve sections and disposed substantially against said bosses, and means acting against said standards for clamping said sections together.

2. In a disk harrow or the like, a bearing construction comprising a pair of bearing sleeve sections separable along a generally vertical plane extending through the axis of the bearing, a pair of generally horizontally disposed openings in said bearing sections, a boss formed on each bearing section, a frame-receiving yoke having spaced apart sections at least partially embracing said bearing sections and rockably mounted on said bosses, a pair of parts disposed at the laterally outer sides of said bearing sections substantially against said bosses and at the outer sides of said spaced apart yoke sections, the latter having upper and lower apertures adapted to be aligned with the horizontal openings in said bearing sections, and securing means extending through said aligned apertures and openings for fixing said frame-receiving yoke to said bearing sections and holding the latter in assembled position.

3. In a disk harrow or the like, a bearing construction comprising a pair of bearing sleeve sections separable along a generally vertical plane extending through the axis of the bearing, a generally horizontally disposed clamping bolt extending through openings in said bearing sections for clamping them together, a pair of bosses surrounding said openings at the laterally outer sides of said openings, a frame-receiving bifurcated yoke having laterally spaced apart apertured portions embracing said sleeve sections and receiving and movable relative to said bosses, respectively, thereby accommodating pivotal movement of said yoke relative to said bearing sections, and a pair of fixed members receiving said clamping bolt and clamped rigidly against said bosses thereby, laterally outwardly of said yoke.

4. In a disk harrow or the like, a bearing construction comprising a pair of bearing sleeve sections providing an inner cylindrical bearing surface, said sections being separable along a generally vertical plane extending through the axis of the bearing, an outwardly extending generally cylindrical boss formed on each of said sleeve sections, a frame-receiving bifurcated yoke pivotally mounted on said bosses, said bearing sleeve sections being apertured through said bosses and the latter being located so that the boss apertures extended pass radially outwardly of and do not intersect the cylindrical bearing surface formed in said sleeve sections, and clamping means extending through said apertures from one bearing section to the other for clamping said bearing sections in assembled relation.

5. In a disk harrow or the like having a gang of disks, a journal member in the form of a spool between adjacent disks, and a frame including a generally vertically extending standard by which the frame is to be supported on said gang: the invention which includes a bearing construction comprising a bearing sleeve disposed about said journal member and having a pair of oppositely extending bosses, a bifurcated yoke having lower apertured sections pivotally mounted on said bosses and an upper socket section receiving said frame standard, said gang including a frame having frame brackets and said bearing sleeve including separable bearing sleeve sections, each carrying one of said bosses and said bosses being apertured, and clamping means extending through the apertures in said bosses for holding said sleeve sections together about said journal member and also serving to fix said frame standards to said bearing sleeve.

6. In a disk harrow or the like, a bearing construction comprising a pair of bearing sleeve sections separable along a generally vertical plane extending through the axis of the bearing, each of said bearing sleeve sections having an outwardly extending cylindrical boss, the boss portions of said bearing sleeve sections being apertured, a bifurcated frame yoke pivotally mounted on said bosses, the latter extending outwardly beyond the outer faces of said yoke, a frame mounted on said bearing sleeve sections and including apertured portions lying against the outer faces of said bosses, and a clamping member extending through the apertures in said boss sections and the apertures in said frame members for clamping the latter to said bearing sleeve and said bearing sleeve sections together.

7. In a disk harrow including a disk gang having a bearing spool, a main frame adapted to be supported at least partially on said disk gang and a gang frame movable with said gang relative to said main frame, a bearing construction comprising a bearing sleeve having a pair of oppositely fore and aft extending cylindrical bosses, there being upper and lower apertures in said bearing sleeve, one extending through said boss portions thereof, a main frame socket yoke having a lower bifurcated portion provided with apertures to accommodate mounting of said yoke on said bosses, a pair of apertured gang frame brackets connected to the gang and clamping bolts extending through said upper and lower apertures and the apertured portions of said gang frame brackets for clamping the latter to said bearing sleeve, said gang frame and disk gang being movable relative to said main frame about the axis defined by said yoke socket and said bosses.

8. The invention set forth in claim 7, further characterized by said yoke being supported on said bosses for pivotal movement about the axis of the latter.

9. The invention set forth in claim 7, further characterized by the upper openings in said bearing sleeve sections being disposed above the axis of said bearing sleeve bosses so as to lower the axis of pivoting of the yoke relative to said bearing sleeve below the axis of the upper clamping bolt.

10. In a bearing construction for disk harrows and the like, a two part bearing sleeve comprising a pair of mating sections having upper and lower openings, clamping bolts disposable in said openings for fastening said bearing sections together, and yoke-receiving bosses disposed on the upper portion of said bearing sections generally about the upper bolt holes therein.

11. The invention set forth in claim 10, further characterized by said bosses having generally cylindrical yoke-receiving surfaces disposed eccentrically with the associated bolt holes so as to provide an axis of movement for the yoke relative to the bearing which lies below the axis of the associated bolt holes.

12. In a bearing construction for disk harrows and the like, a pair of mating bearing sleeve sections, each of said sections having on the outer side thereof upper and lower apertured bosses and a central boss, said bosses being disposed in alignment when said bearing sleeve sections are held together in assembled relationship, upper and lower clamping bolts disposed in the apertures in said upper and lower bosses for clamping said bearing sleeve sections together, and a frame-receiving bifurcated yoke having opposite portions apertured to receive the central bosses on said yoke, said yoke portions being slotted at upper and lower points to receive the upper and lower bosses of said bearing sleeve sections so as to accommodate pivotal movement between said bearing sleeve and said yoke about the axis defined by said central bosses.

13. In a bearing construction for disk harrows and the like, a two part bearing sleeve comprising a pair of mating sections having upper and lower sets of registering openings, clamping bolts disposable in said openings for fastening said bearing sections together, and yoke-receiving bosses disposed on said bearing sections and disposed generally about one set of said openings.

14. The invention set forth in claim 13, further characterized by said yoke-receiving bosses having generally cylindrical surfaces disposed eccentrically with respect to the axis of the associated boss openings, thereby providing for an axis of movement of the yoke relative to the bearing which lies closer to the center line of the bearing than the axis of said associated boss openings.

WILLIAM P. OEHLER.

References Cited in the file of this patent

UNITED STATES PATENTS

| Number | Name | Date |
|---|---|---|
| 893,682 | Wells | July 21, 1908 |
| 1,679,844 | Volckhausen | Aug. 7, 1928 |
| 1,698,162 | Lynch | Jan. 8, 1929 |
| 1,792,711 | Rockstad | Feb. 17, 1931 |
| 2,020,545 | Goble | Nov. 12, 1935 |
| 2,076,693 | Altgelt et al. | Apr. 13, 1937 |
| 2,097,244 | Sjogren et al. | Oct. 26, 1937 |
| 2,264,783 | White | Dec. 2, 1941 |
| 2,394,276 | Venditty | Feb. 5, 1946 |
| 2,421,306 | White | May 27, 1947 |